United States Patent
Krupp

[11] Patent Number: 6,016,927
[45] Date of Patent: Jan. 25, 2000

[54] ROTATING TRAY SYSTEM

[76] Inventor: William A. Krupp, N8949 W. Shore La., St. Cloud, Wis. 53079

[21] Appl. No.: 09/016,779

[22] Filed: Jan. 30, 1998

[51] Int. Cl.[7] ................................. A47F 3/14; A47J 47/00
[52] U.S. Cl. ..................................... 211/126.2; 211/131.1
[58] Field of Search ............................. 211/126.2, 131.1, 211/85.4

[56] References Cited

U.S. PATENT DOCUMENTS

| | | | |
|---|---|---|---|
| D. 354,869 | 1/1995 | Sayler | D6/455 |
| 922,888 | 5/1909 | Grunwaldt | 211/131.1 X |
| 2,327,742 | 8/1943 | Rosenberg | 211/131.1 |
| 2,678,143 | 5/1954 | Dillingham et al. | 206/509 |
| 2,951,593 | 9/1960 | Lake | 211/131.1 X |
| 3,498,471 | 3/1970 | Dirkx | 211/131.1 |
| 4,300,674 | 11/1981 | Davet | 206/6.1 |
| 4,549,664 | 10/1985 | Gowan et al. | 211/131.1 |
| 4,736,856 | 4/1988 | Alneng et al. | 211/131 |
| 4,883,283 | 11/1989 | Hazelett et al. | 248/231.61 X |
| 5,279,429 | 1/1994 | Sagel | 211/131 |
| 5,280,871 | 1/1994 | Chaung | 248/181.1 X |
| 5,312,003 | 5/1994 | Domenig | 211/144 |
| 5,479,837 | 1/1996 | Kyle | 74/608 |
| 5,479,852 | 1/1996 | Lloyd | 108/146 |
| 5,524,775 | 6/1996 | Kaline | 211/131.1 |
| 5,660,122 | 8/1997 | Sickles et al. | 108/193 |
| 5,823,358 | 10/1998 | Leyden et al. | 211/8 |
| 5,855,347 | 1/1999 | Hollingsworth et al. | 211/59.1 X |

*Primary Examiner*—Daniel P. Stodola
*Assistant Examiner*—Erica B. Harris
*Attorney, Agent, or Firm*—Donald Cayen

[57] ABSTRACT

A rotating tray system comprises several circular trays stacked for rotation on a post. The trays are supported by respective pins secured to the post. Each tray has at least one compartment and a cutout. A cover with a similar cutout is fixed to the post and closely overlies the uppermost tray of the stack. The trays can be rotated to a storage mode whereat the tray cutouts are aligned with the cover cutout and the tray contents are hidden from view. A selected tray can be rotated such that its cutout is misaligned with the cover cutout, thereby bringing the tray compartments into view under the cover cutout. Grooves on the tray engage the associated pin to loosely retain the tray against rotation both when the tray cutout is aligned with the cover cutout and when a selected tray compartment is aligned with the cover cutout. A lock mechanism prevents tray rotation when the tray cutout is aligned with the cover cutout.

13 Claims, 8 Drawing Sheets

ROTATING TRAY SYSTEM

BACKGROUND OF THE INVENTION

1. Field of the Invention

This invention pertains to the storage of small items, and more particularly to vertical stacks of rotatable trays.

2. Description of the Prior Art

Various equipment has been developed to conveniently store relatively small items. For example, U.S. Pat. Des. No. 354,869 describes trays that are stackable directly on one another. To gain access to the items stored in a lower tray, the next upper tray must be pulled off the lower tray. U.S. Pat. Nos. 3,951,079; 4,736,856; 5,279,429; and 5,312,003 show lazy susans having several trays that rotate about a common post. U.S. Pat. Nos. 3,498,471 and 4,823,966 disclose tray sets in which rectangular trays are rotatable at one of their ends about a post.

Of the foregoing, only the tray set of the U.S. Pat. No. 3,498,471 is designed such that the trays are closely spaced along the post. In that design, the post is eccentric to the centers of the trays. To expose the contents of a desired tray, it must be rotated from under the next higher tray.

The tray sets of the other aforementioned patents are all spaced vertically from each other a distance sufficient to reach the items on all lower trays without interference from the next higher tray. Consequently, the total space occupied by the systems includes space between the trays in which no items are stored, i.e., wasted space.

A further drawback of all the systems mentioned above is that they lack covers for the stored items. Consequently, the items can fall out of the various trays during use and while transporting the systems.

Thus, despite the availability of several kinds of rotatable storage systems, there nevertheless is room for improvement to them.

SUMMARY OF THE INVENTION

In accordance with the present invention, a rotating tray system is provided that compactly stores selected items while protecting them against loss. This is accomplished by an apparatus that includes stacked trays in which the floor of a tray serves as a cover for a next lower tray.

The trays rotate about their respective central longitudinal axes, which are concentric with a stationary post. Each tray comprises a round floor, an outer peripheral wall upstanding from the floor, a central hub, and a series of radially extending walls between the hub and the outer wall. The radial walls divide the space between the hub and the outer wall into separate sector-shaped compartments. The floor and outer wall are missing at one of the compartments, thereby leaving a sector-shaped cutout in the tray. The floor of one tray is closely spaced above the top of the underlying tray.

The trays rotate about the post by means of openings through the hubs. The trays are supported for rotation on respective pins that extend radially through the post. The bottom surface of each hub rests on an associated post pin. Each hub bottom surface has a groove that cooperates with the pin to loosely retain the tray at a predetermined angular position on the post. The post pins and the tray hub grooves are set up such that the cutouts of all the trays are aligned with each other when the hubs engage their associated pins.

A cover is fixed to the post a short distance above the uppermost tray of the stack. The cover has a cutout of the same size and shape as the cutouts in the trays. The cover cutout is located such that the cutouts in the trays are aligned with it when the grooves in the tray hubs engage their associated post pins. When all the trays are rotated such that their cutouts are aligned with the cover cutout, the rotating tray system is in a storage mode. All the items in all the tray compartments are then out of sight. Because of the close proximity of the top of a tray compartment and the floor of the next higher tray, the items are protected against loss. A lock mechanism positively prevents unintended rotation of the trays from the storage mode.

To remove an item from any compartment of any tray, the lock mechanism is released. The trays above the desired tray are rotated such that their respective cutouts are aligned with the cutout in the cover. The desired tray is rotated until the selected compartment is aligned with the cutouts in the higher trays and in the cover. The items can then be easily removed.

The method and apparatus of the invention, using alignable cutouts in closely spaced trays and a fixed cover, thus stores a wide variety of items in a small space. The probability of losing an item from the trays is remote, even though the items are readily accessible when needed.

Other advantages, benefits, and features of the present invention will become apparent to those skilled in the art upon reading the detailed description of the invention.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Figure 1:
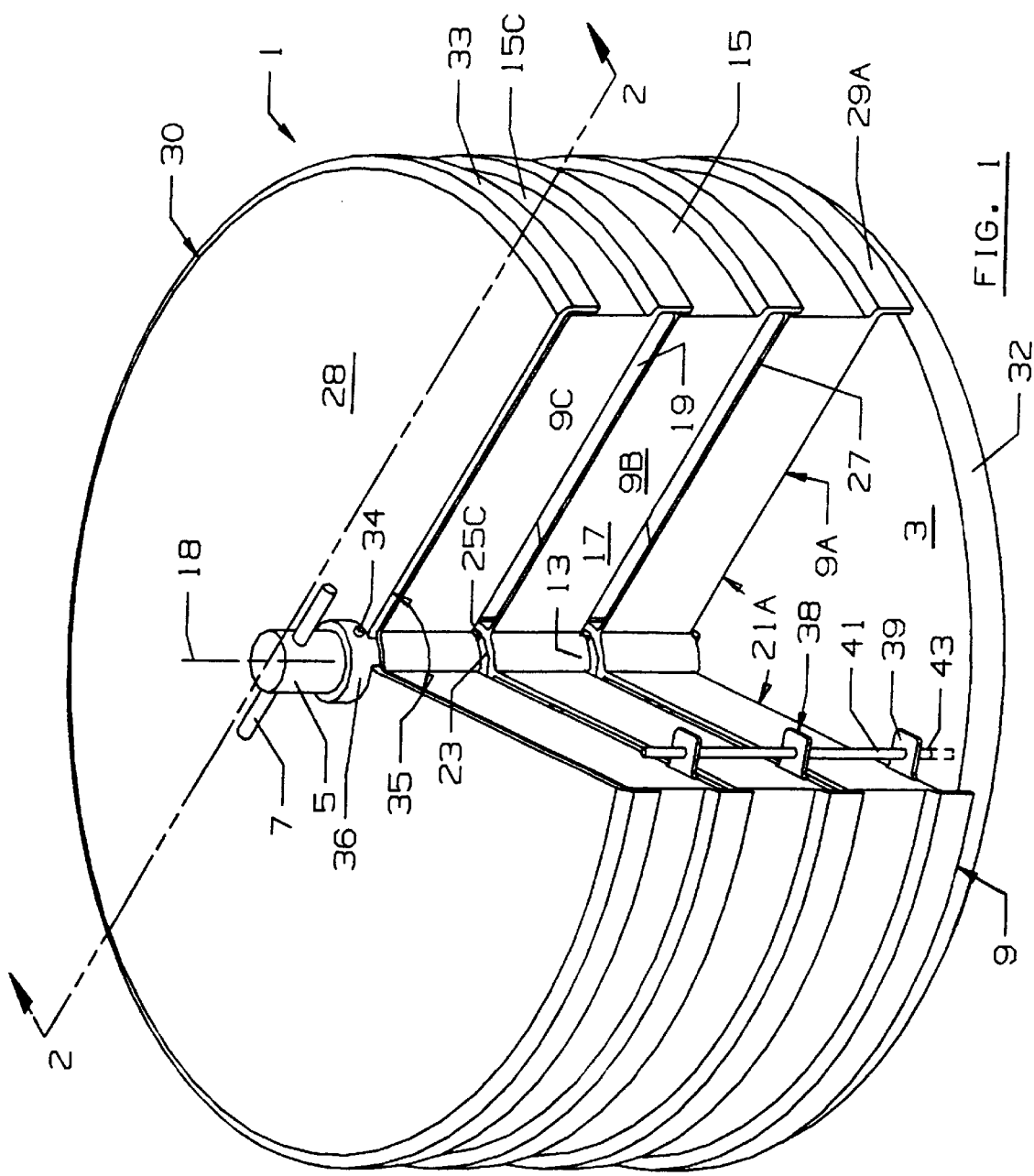
FIG. 1 is a perspective view of the invention shown in a storage mode.
Figure 2:
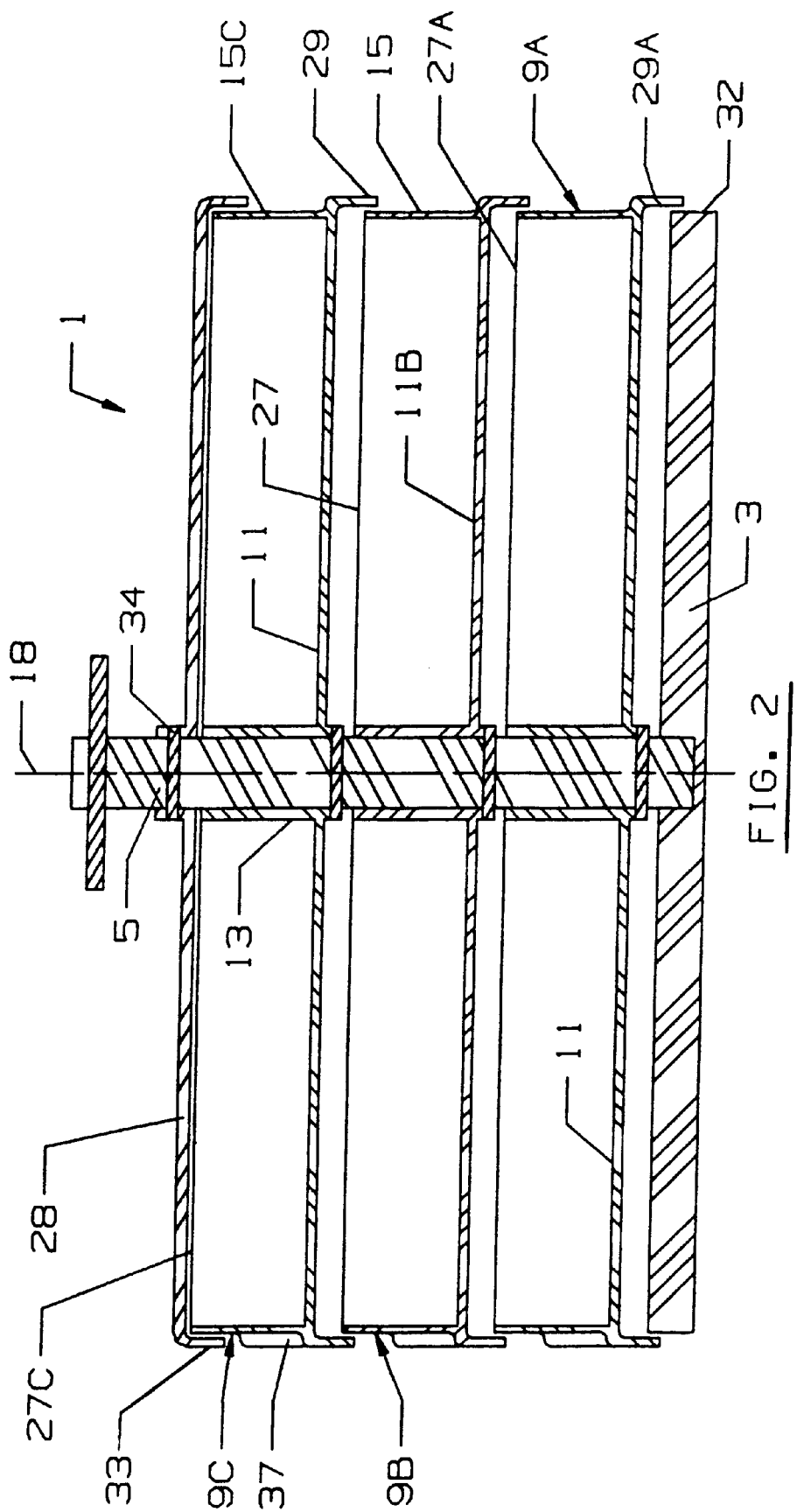
FIG. 2 is a cross sectional view taken along line 2—2 of FIG. 1.
Figure 3:
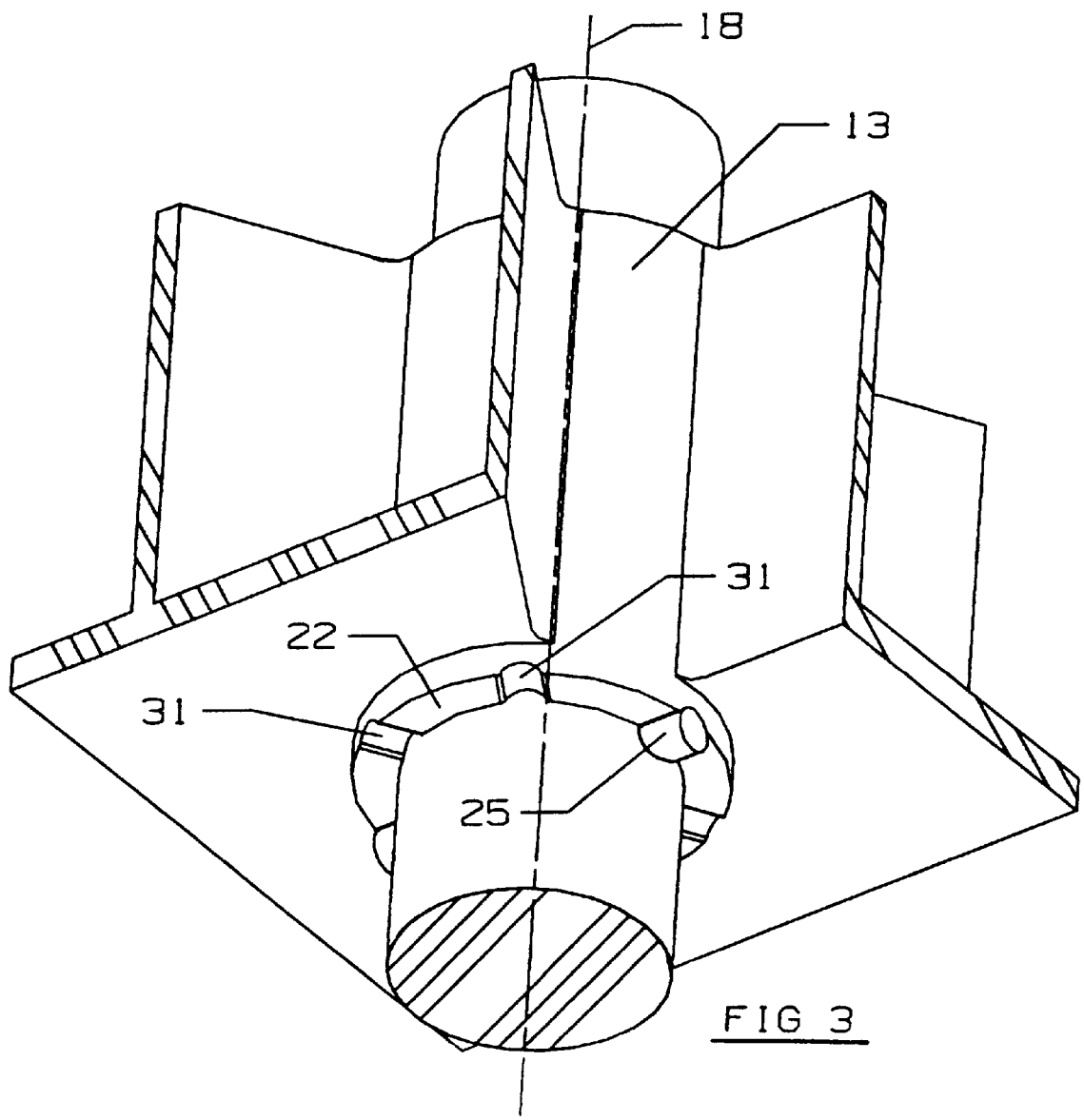
FIG. 3 is a broken perspective view on an enlarged scale showing the grooves in the tray hub.

Referring to FIGS. 1–3, a rotating tray system 1 is illustrated that includes the present invention. The rotating tray system 1 is particularly useful for storing different kinds of small items, such as pieces of hardware. However, it will be understood that the invention is not limited to craft related applications.

The rotating tray system 1 is comprised of a base 3, which preferably is circular in shape. Upstanding from the center of the base is a center post 5. A handle 7 at the top of the post 5 enables easy carrying of the tray system.

Figure 4:
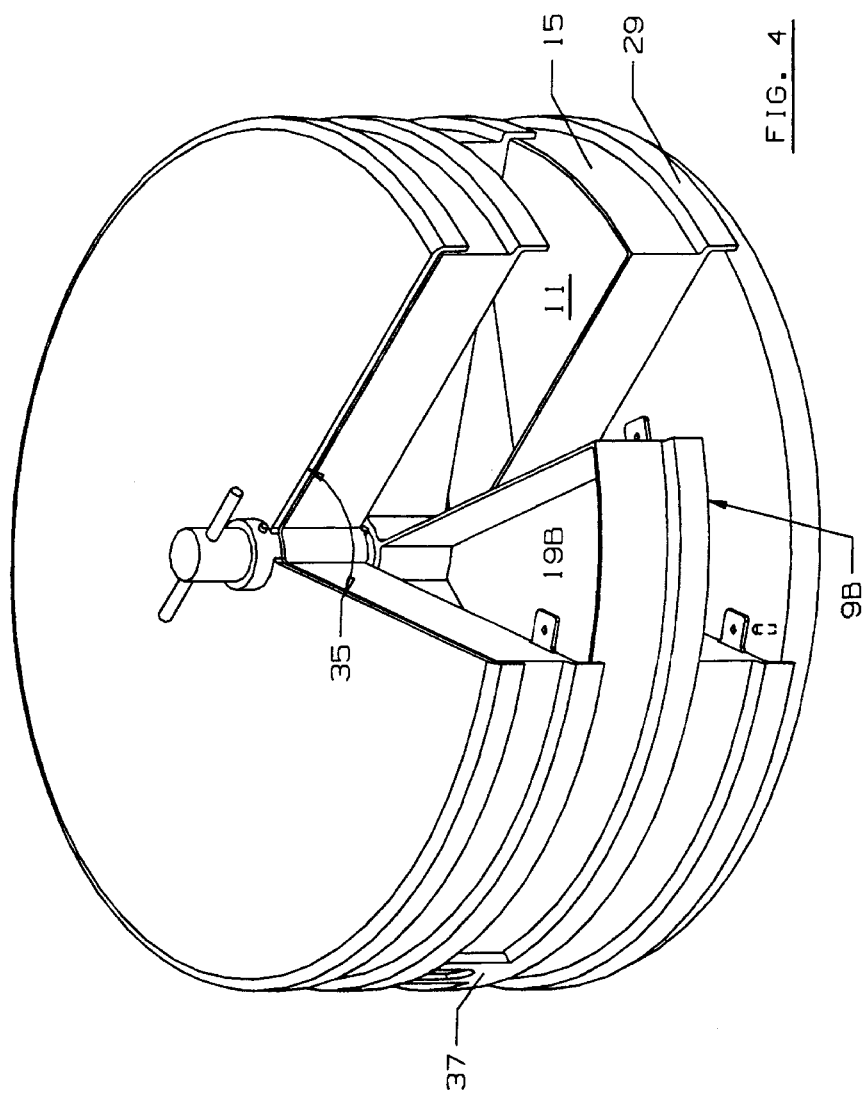
FIG. 4 is a view generally similar to FIG. 1, but showing a selected tray rotated to partially expose a compartment thereof.

Rotatable on the post 5 are a number of identical trays 9. In the embodiment of the invention shown, three trays 9A, 9B, and 9C are shown. It will be realized, of course, that more or fewer than three trays can be used. Each tray 9 is comprised of a circular floor 11, a central hub 13, and an outer peripheral wall 15. The floor 11, hub 13, and outer wall 15 are concentric about a longitudinal axis 18. A number of radial walls 17 extend from the hub 13 to the outer wall 15 so as to divide the tray into several sector-shaped compartments 19, as shown in FIG. 4. There is a peripheral generally L-shaped lip 29 that depends from the junction of the tray floor 11 and the outer wall 15. The lip 29 is radially outward of the outer wall. The floor 11 and lip 29 are removed at one compartment, so that the tray defines a cutout, such as cutout 21A of the tray 9A.

The trays 9 rotate about the post 5 by means of openings 23 through the hubs 13 that are concentric with the axis 18. Each tray is supported on the bottom surface 22 of its hub by a respective pin 25 that is secured to the post. For example, the tray 9C is supported by the post pin 25C. When the trays are assembled onto the post and supported by their respective pins 25, the floor 11 of a tray is closely spaced to the top surface 27 of the next lower tray. For instance, the floor 11B of the tray 9B closely overlies the top 27A of the tray 9A. Accordingly, the floor 11B serves as a cover for the compartments of the tray 9A. In addition, the lip 29 of a tray overhangs the top 27 of the outer wall 15 of the next lower tray. The lip further contributes to enclosing the compartments 19 of the next lower tray. The lip 29A of the lowermost tray 9A overlies the periphery 32 of the base 3.

To enclose the compartments of the top tray 9C, the rotating tray system 1 further comprises a cover 30. In the particular construction shown, the cover 30 has a flat disk 28 and a central shoulder 36. The cover is fixed to the post 5 by a pin 34 that passes through the post and the shoulder 36. The cover disk 28 is closely spaced from the top surface 27C of the tray 9C. A lip 33 depends from the cover disk 28 and overhangs the outer wall 15C of the uppermost tray 9C. The cover disk 28 and lip 33 cooperate to enclose the compartments of the tray 9C. The cover disk and lip have a cutout 35 that is the same size and shape as the cutouts 21 in the trays 9. Rotating the trays on the post 5 brings the tray compartments 19 under the cover cutout 35.

To control the rotation of the trays 9 about the post 5, the bottom surface 22 of each hub 13 is formed with a number of shallow radial grooves 31. The radius of the grooves 31 is the same as that of the post pins 25. The grooves are equi-angularly spaced about the axis 18. There is a groove for each compartment 19 and another for the cutout 21. The grooves are located relative to the post pins 25 such that a groove engages its associated post pin when the tray cutout 21 is aligned with the cover cutout 35. Further, a groove will engage the post pin each time a tray compartment 19 is aligned with the cover cutout 35. As a result, the tray is loosely retained against rotation whenever its cutout or a compartment is aligned with the cover cutout. To assist rotating the trays, there is one or more small tabs with finger holes 37 on the outer wall 15 of each tray.

In use, the uppermost tray 9C is rotated such that one of its compartments is under the cutout 35 in the cover 30. The compartment is filled with selected items. The uppermost tray is rotated intermittently to fill all the compartments in it. Then the uppermost tray is rotated such that the cutout therein is aligned with the cover cutout. The lower trays 9 are filled in the same way.

After filling the rotating tray system 1, it will initially be considered to be in a storage mode as shown in FIG. 1. In that situation, all the trays 9 are positioned such that their respective cutouts 21 are aligned with the cover cutout 35. All the compartments 19 of the trays are then hidden from view, and the items in them are inaccessible. The pins 25 and grooves 31 cooperate to loosely retain the trays in the storage mode.

FIG. 4 shows tray 9B rotated from its storage mode of FIG. 1 so as to bring a compartment 19B into partial alignment with the cover cutout 35. The items in the compartment 19B are thus partially exposed for viewing. The cooperation of the pin 25 and the grooves 31 on the trays 9A and 9C inhibit unintentional rotation of those trays when the tray 9B is rotated.

Figure 5:
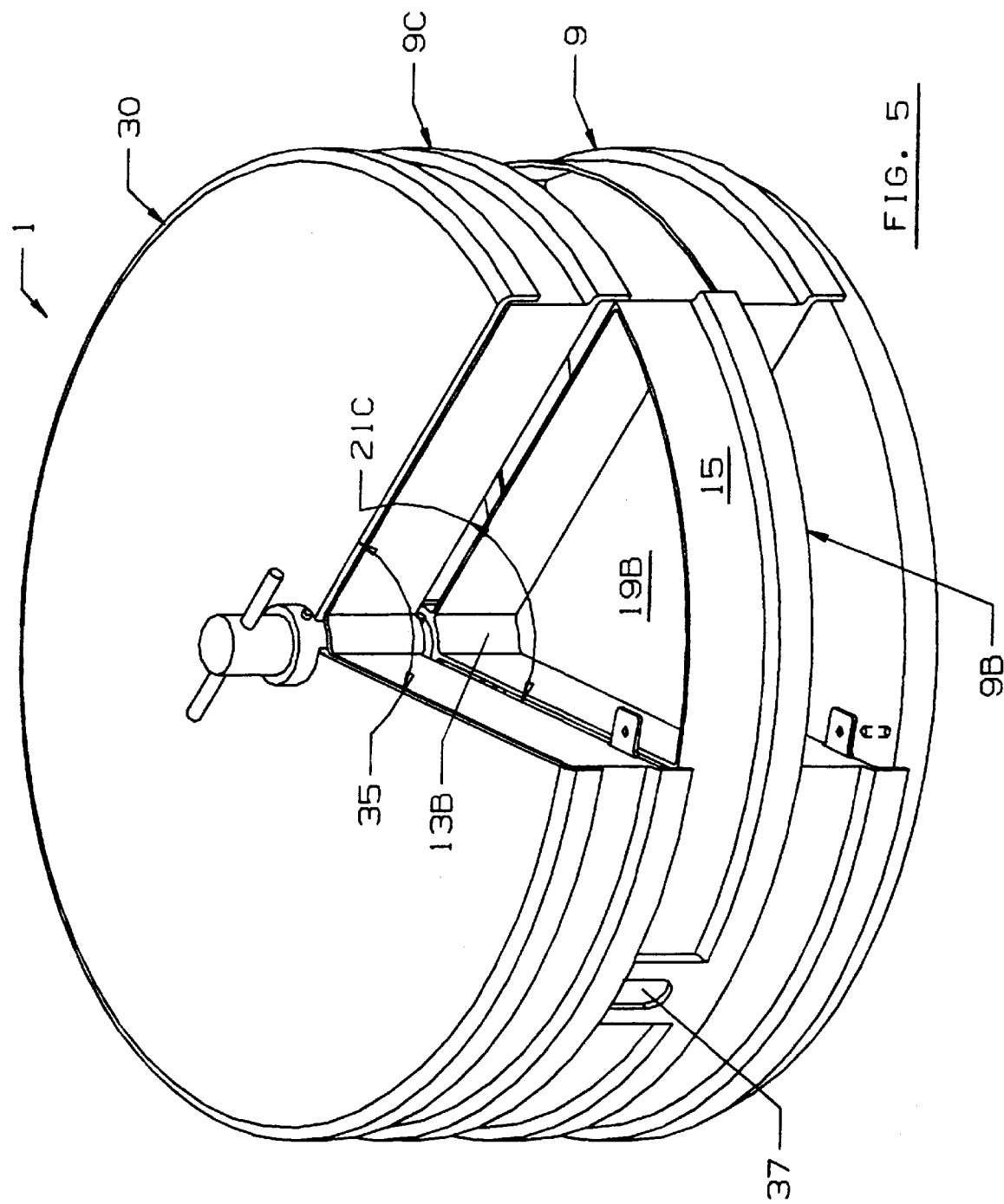
FIG. 5 is a view generally similar to FIG. 4, but showing the selected tray rotated to fully expose the compartment thereof.

In FIG. 5 the tray 9B has been rotated to a working mode whereat the compartment 19B is fully aligned with the cover cutout 35 and with the cutout 21C of tray 9C. Accordingly, items in the compartment 19B are completely viewable and accessible. The pin 25 and the appropriate grooves 31 in the bottom surface 22 of the tray hub 13B cooperate to retain the tray 19B against further rotation until intended. It will be appreciated that the cutouts 21 of all trays above a selected tray must be aligned with the cover cutout in order to obtain access to the compartments of the selected tray.

Further in accordance with the present invention, the trays 9 can be positively locked against unintended rotation. Returning to FIGS. 1 and 2, a lock mechanism 38 comprises a small plate 39 added to each tray parallel to the tray floor 11. The plates 39 project into the cutouts 21 of the respective trays. The plates are in vertical alignment with each other when the tray cutouts 21 are aligned with each other. A rod 41 passes through holes in the plates 39 and engages a hole 43 in the base 3. Using the lock mechanism 38 is particularly helpful when transporting the rotating tray system 1. Removing the rod frees the tray for rotation, FIGS. 4 and 5, subject to the control produced by the pins 25 and grooves 31.

Figure 6:
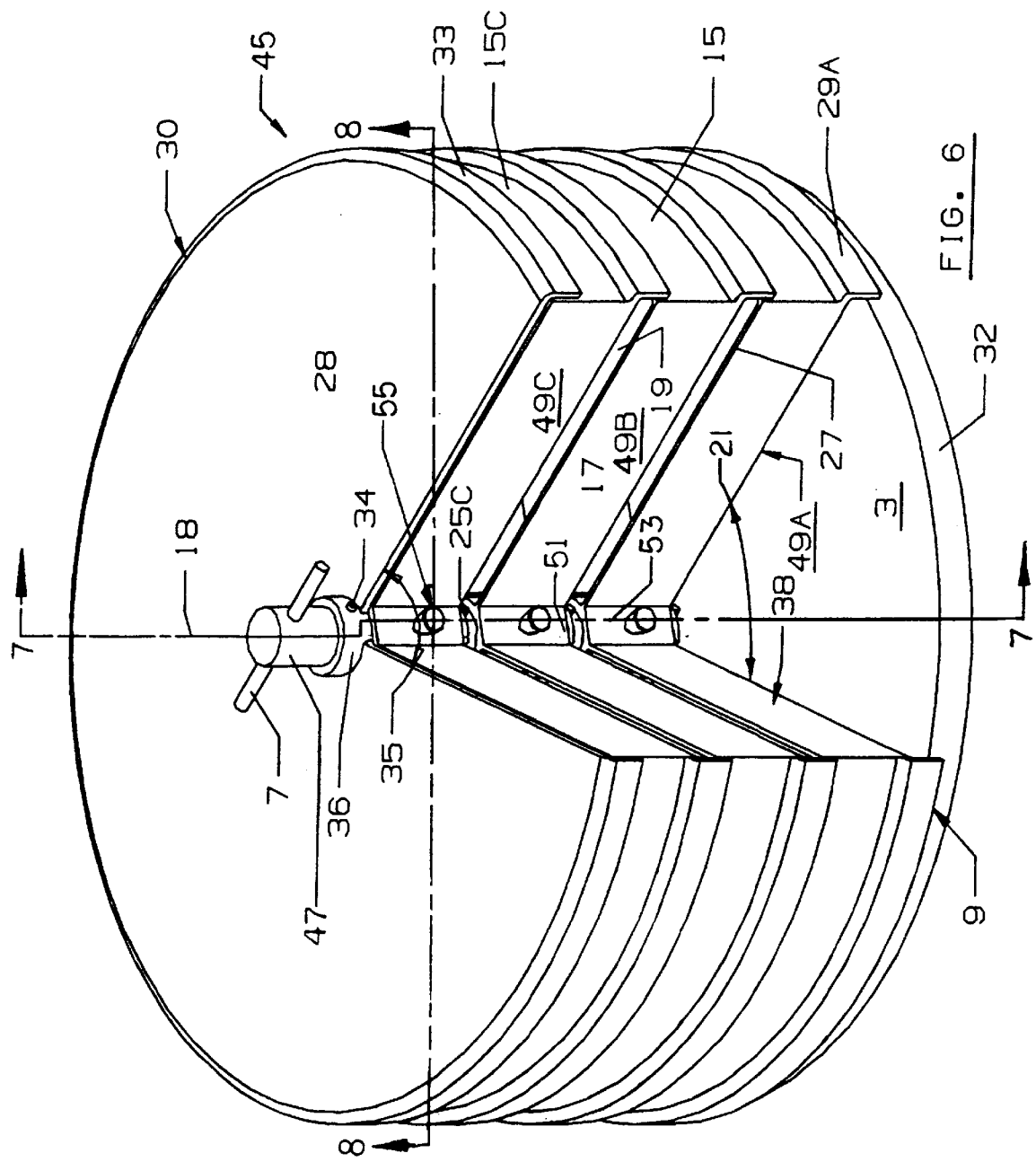
FIG. 6 is a view generally similar to FIG. 2, but showing an alternate construction of the lock mechanism.
Figure 7:
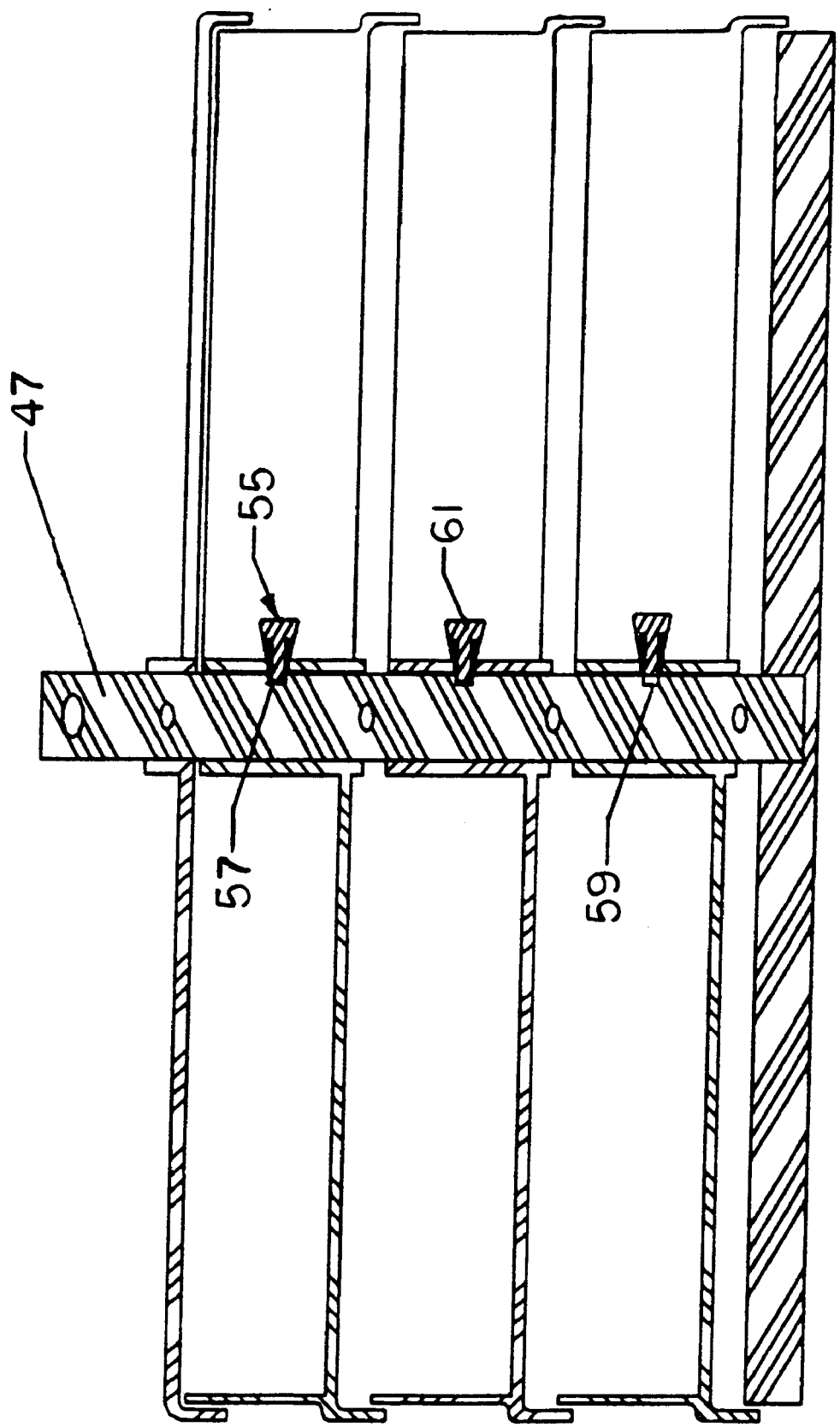
FIG. 7 is a cross sectional view taken along line 7—7 of FIG. 6.
Figure 8:
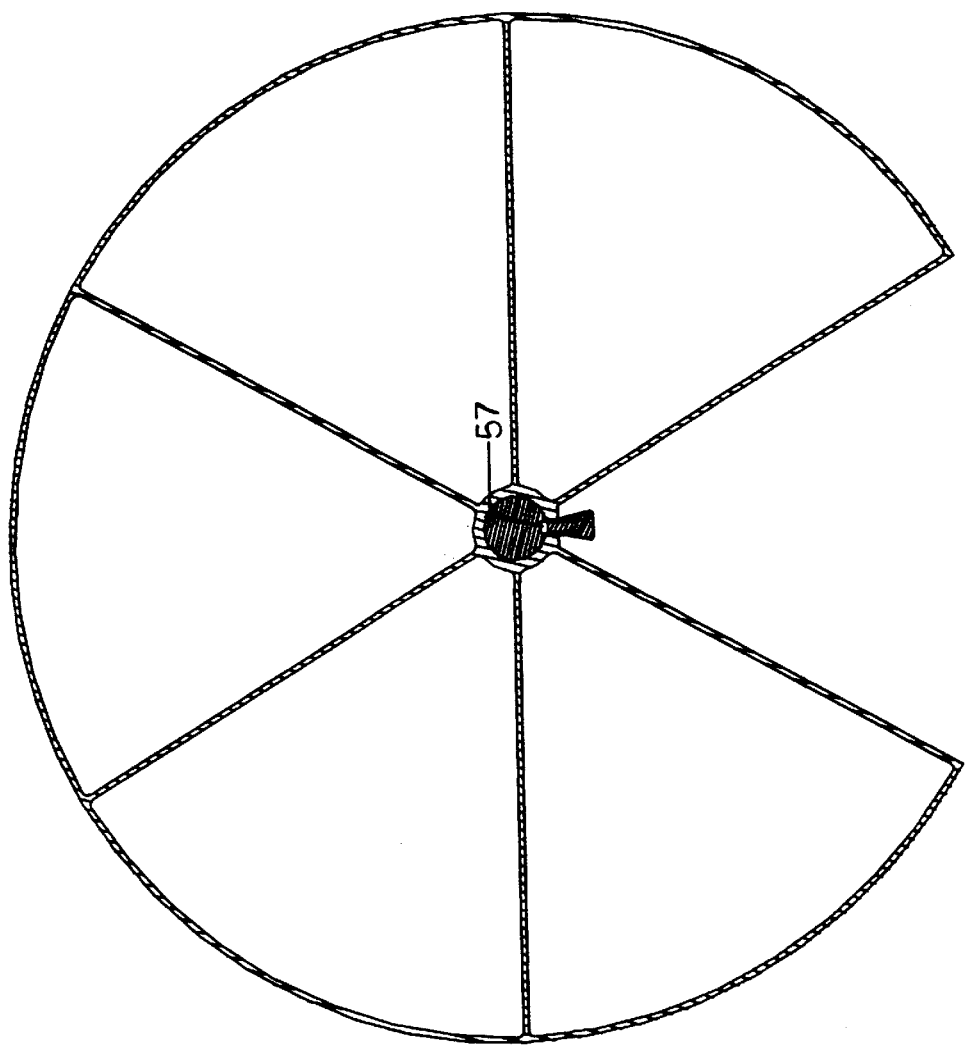
FIG. 8 is a cross sectional view taken along line 8—8 of FIG. 6.

Turning to FIGS. 6–8, an alternate rotating tray system 45 is shown. The rotating tray system 45 has a base 3' with a post 47. Three trays 49A, 49B, 49C are shown, each having a hub 51 that receives the post 47. Each tray 49A–49C further has a cutout 21'. The hub 51 of each tray has a flat surface 53 within the tray cutout 21'.

Held in the hub 51 at the flat surface 53 of each tray 49A–49C is a spring-loaded plunger 55. For example, a Model 56-0-22041-03 spring-loaded plunger marketed by Southco Inc. may be used. The studs 57 of the spring-loaded plunger 55 enter corresponding radial holes 59 in the post 47 when the trays are in the storage mode, thereby preventing rotation of the trays. Pulling the spring-loaded plunger knobs 61 withdraws the studs 57 from the post holes 59 and enables rotation of the trays to the working mode.

In summary, the results and advantages of small hardware and other items can now be more fully realized. The rotating tray system provides both convenient and compact storage for the items. This desirable result comes from using the combined functions of the trays and the cover 30. The trays are closely spaced to each other along the post such that the floor of one tray serves as a cover for the next lower tray. The cover 30 is used to cover the uppermost tray. The lips 29 and 33 further contribute to the protection and retention of the items stored in the trays. The pins 25 and grooves 31 cooperate to loosely retain either a selected tray compartment 19 or the tray cutout in alignment with the cover cutout 35. A lock mechanism positively locks the trays to the base when all the tray cutouts are aligned with the cover cutout.

It will also be recognized that in addition to the superior performance of the rotating tray system, its construction is such as to cost no more than traditional storage trays of like capacity. Also, since the tray system is made of a simple design and with rugged components, it will give long service with minimal maintenance.

Thus, it is apparent that there has been provided, in accordance with the invention, a rotating tray system that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A rotating tray system comprising:
   a. a base;
   b. a post upstanding from the base;
   c. at least one tray rotatable on the post, the tray comprising a central hub with an opening therethrough that receives the post, a floor, an outer peripheral wall, and a plurality of radial walls that divide the tray into compartments, the tray defining a cutout of a predetermined size and shape in the floor and outer wall; and
   d. a cover fixed to the post in a spatial relation above the tray, the cover defining a cutout of the same size and shape as the tray cutout,
      so that the tray can be rotated between a storage mode whereat the cutout therein is aligned with the cover cutout and the tray compartments are inaccessible under the cover, and a working mode whereat a selected tray compartment is aligned with the cover cutout for viewing and removing items in the selected tray compartment.

2. The rotating tray system of claim 1 wherein:
   a. there is a pin in the post; and
   b. the tray hub has a bottom surface that is supported by the pin, the hub bottom surface defining a plurality of angularly spaced grooves therein, there being a groove for each tray compartment and for the tray cutout, the pin engaging a first groove when the tray cutout is aligned with the cover cutout, the pin engaging a second groove when the selected tray compartment is aligned with the cover cutout, the tray being loosely retained against further rotation when the pin engages the first or second groove.

3. The rotating tray system of claim 1 wherein:
   a. there are first and second trays on the post, the first tray being proximate the cover and the second tray being between the first tray and the base;
   b. the cover has a flat disk that is closely spaced to the first tray to thereby aid in enclosing the first tray compartments;
   c. the cover has a lip depending from the flat disk, the lip overhanging the first tray outer peripheral wall and cooperating with the flat disk to aid in enclosing the first tray compartments; and
   d. the first tray has a lip depending therefrom that overhangs the outer peripheral wall of the second tray, the first tray floor and lip cooperating to enclose the compartments of the second tray.

4. The rotating tray system of claim 1 further comprising means for selectively locking the tray against rotation.

5. The rotating system of claim 1 further comprising a plunger held in the tray hub solely for reciprocation therein and located in the tray cutout, the plunger being selectively operable to enter a hole in the post to thereby positively lock the tray against rotation on the post, and to withdraw from the hole in the post to thereby enable the tray to rotate on the post.

6. A rotating tray system comprising:
   a. a base;
   b. a post upstanding from the base;
   c. at least one tray rotatable on the post, the tray comprising a central hub with an opening therethrough that receives the post, a floor, an outer peripheral wall, and a plurality of radial walls that divide the tray into compartments, the tray defining a cutout of a predetermined size and shape in the floor and outer wall, wherein:
      i. the tray further comprises a plate that extends into the tray cutout; and
      ii. a rod passes through the plate and engages the base to prevent rotation of the tray, the rod being selectively removable from the plate and disengageable from the base to enable the tray rotation; and
   d. a cover fixed to the post above the tray, the cover defining a cutout of the same size and shape as the tray cutout,
      so that the tray can be rotated between a storage mode whereat the cutout therein is aligned with the cover cutout and the tray compartments are inaccessible under the cover, and a working mode whereat a selected tray compartment is aligned with the cover cutout for viewing and removing items in the selected tray compartment.

7. Apparatus for removably storing selected items in a compact space comprising:
   a. a base with a post upstanding therefrom;
   b. a cover fixed to the post and defining a sector-shared cutout; and
   c. a vertical stack of generally circular trays that store the items, the trays having respective central longitudinal axes concentric with the post, each tray defining a sector-shaped cutout, each tray being independently rotatable on the post to selectively align the cutout therein with the cutouts in the other trays and with the cover cutout; and
   d. a rod passing through plates on the trays and engaging the base to prevent rotation of the trays on the post.

8. Apparatus for removeably storing selected items in a compact space comprising:
   a. a base with a post upstanding therefrom;
   b. a cover fixed to the post and defining a sector-shaped cutout; and
   c. a vertical stack of generally circular trays that store the items, the trays having respective central longitudinal axes concentric with the post, each tray defining a sector-shaped cutout, each tray being independently rotatable on the post to selectively align the cutout therein with the cutouts in the other trays and with the cover cutout; and
   d. a lock mechanism that prevents rotation of the trays on the post when the tray cutouts are aligned with the cover cutout, the lock mechanism comprising:
      i. a plate joined to each tray and extending into the respective tray cutout; and
      ii. a rod passing through the plates and engaging a hole in the base.

9. A method of storing items in and removing the items from a small space comprising the steps of:

a. providing a plurality of circular trays each having at least one compartment and a cutout;
b. rotatably supporting the trays in a vertical stack on a post;
c. providing a cover having a cutout;
d. fixing the cover to the post in a spatial relation above the uppermost tray of the stack thereof; and
e. rotating the trays to a storage mode whereat the cutouts of the respective trays are aligned with the cover cutout and thereby preventing viewing of and access to the items in the trays.

10. The method of claim 9 wherein:
   a. the step of providing a plurality of trays comprises the step of providing a plurality of trays each with a floor and a lip depending from the floor; and
   b. the step of supporting the trays on a post comprises the step of overhanging the next lower tray of the stack thereof with the lip of the next higher tray of the stack thereof and thereby aiding to enclose the compartment of the next lower tray.

11. The method of claim 9 comprising the further step of rotating a selected tray to a working mode whereat the cutout therein is misaligned with the cover cutout and thereby exposing the items in the selected tray under the cover cutout for viewing and removing.

12. The method of claim 11 wherein:
   a. the step of rotatably supporting the trays on the post comprises the steps of:
      i. securing a pin to the post in operative association with each tray; and
      ii. supporting the trays directly on the associated pins;
   b. the step of rotating the trays to a storage mode comprises the step of engaging respective first grooves in the trays with the associated pins and loosely retaining the trays against rotation away from the storage mode; and
   c. the step of rotating the trays to a working mode comprises the step of engaging respective second grooves in the trays with the associated pins and loosely retaining the trays against rotation away from the working mode.

13. A method of storing items in and removing the items from a small space comprising the steps of:
   a. providing a plurality of circular trays each having at least one compartment and a cutout;
   b. rotatable supporting the trays in a vertical stack on a post;
   c. providing a cover having a cutout;
   d. fixing the cover to the post above the uppermost tray of the stack thereof;
   e. rotating the trays to a storage mode whereat the cutouts of the respective trays are aligned with the cover cutout and thereby preventing viewing of and access to the items in the trays; and
   f. locking the trays to each other and to the base when the trays are in the storage mode and thereby preventing rotation of the trays.

* * * * *